(12) United States Patent
Adamson

(10) Patent No.: US 7,771,524 B2
(45) Date of Patent: Aug. 10, 2010

(54) SECURITY INK

(76) Inventor: George William Adamson, 2067 Lyndhurst Ave., Camarillo, CA (US) 93010

( * ) Notice: Subject to any disclaimer, the term of this patent is extended or adjusted under 35 U.S.C. 154(b) by 583 days.

(21) Appl. No.: 10/589,088

(22) PCT Filed: Feb. 10, 2005

(86) PCT No.: PCT/US2005/004105

§ 371 (c)(1),
(2), (4) Date: May 2, 2007

(87) PCT Pub. No.: WO2005/080514

PCT Pub. Date: Sep. 1, 2005

(65) Prior Publication Data

US 2008/0025786 A1 Jan. 31, 2008

Related U.S. Application Data

(60) Provisional application No. 60/543,868, filed on Feb. 12, 2004.

(51) Int. Cl.
*C09D 11/00* (2006.01)
*B43K 7/00* (2006.01)
(52) U.S. Cl. .................. 106/31.43; 106/31.75; 401/209

(58) Field of Classification Search .............. 106/31.43, 106/31.75; 401/209
See application file for complete search history.

(56) References Cited

U.S. PATENT DOCUMENTS

| 3,425,779 | A |   | 2/1969  | Fisher et al. |            |
|-----------|---|---|---------|---------------|------------|
| 4,045,397 | A |   | 8/1977  | Parkinson et al. |         |
| 4,877,451 | A | * | 10/1989 | Winnik et al. | 106/31.45  |
| 5,449,400 | A | * | 9/1995  | Van Lint et al. | 106/31.43 |
| 5,652,286 | A | * | 7/1997  | Deng | 524/261 |
| 5,935,311 | A | * | 8/1999  | Matsumura et al. | 106/31.43 |
| 6,264,730 | B1 | * | 7/2001 | Matsumura et al. | 106/31.43 |
| 6,413,306 | B1 | * | 7/2002 | Kraiter et al. | 106/31.85 |
| 2009/0031920 | A1 | * | 2/2009 | Kim | 106/31.13 |

FOREIGN PATENT DOCUMENTS

EP 0623658 11/1994
WO WO 96/23844 8/1996

OTHER PUBLICATIONS

Written Opinion of the International Searching Authority, dated Aug. 24, 2006.

\* cited by examiner

*Primary Examiner*—Helene Klemanski
(74) *Attorney, Agent, or Firm*—Honigman Miller Schwartz and Cohn LLP; David J. Johnson; Johnathan P. O'Brien

(57) ABSTRACT

In general, the invention relates to a security ink useful for producing indelible markings.

26 Claims, 2 Drawing Sheets

SECURITY INK

This application claims priority under 35 U.S.C. §119(e) to U.S. Provisional Application Ser. No. 60/543,868 filed on Feb. 12, 2004.

In general, the invention relates to a security ink. In particular, the invention relates to an ink formulation which produces indelible markings.

BRIEF DESCRIPTION OF THE BACKGROUND

Inks commonly used in pens are susceptible to erasure or removal with commercially available solvents. A thief can erase payee information, amounts, or signatures on checks or other important documents by washing the documents with organic solvents, such as lighter fluid. After the documents have been "washed," the thief can enter false information and use the falsified documents to abscond with personal identity, money, or other valuable assets.

Accordingly, there is a need for a security ink that is indelible to washing with solvents.

SUMMARY OF THE INVENTION

In general, the invention relates to indelible inks. The indelible inks include a dye or pigment in an organic solvent and a coupling agent.

In one aspect, the invention features an indelible ink solution including an organic solvent system; a dye or pigment dissolved in the organic solvent system; and an amino silane coupling agent.

In another aspect, the invention features a pen reservoir including a housing having an indelible ink solution. The ink solution includes an organic solvent system, a dye or pigment dissolved or dispersed in the organic solvent system, and an amino silane coupling agent. The pen reservoir can be capped at atmospheric pressure or pressurized with between about 3 to about 40 psig nitrogen or a gas containing at least 70% nitrogen. The housing can include a ball point tip.

In still another aspect, the invention features a ball point pen including a housing containing a ball point pen cartridge in which the ball point pen cartridge includes a ball point tip and an indelible ink solution. The indelible ink solution includes an organic solvent system, a dye or pigment dissolved or dispersed in the organic solvent system, and an amino silane coupling agent. The pen reservoir can be capped at atmospheric pressure or pressurized with between about 3 to about 40 psig nitrogen or a gas containing at least 70% nitrogen.

In yet another aspect, the invention features a method of recording a security marking. The method includes providing a writing instrument containing an indelible ink solution, wherein the indelible ink solution includes an organic solvent system, a dye or pigment dissolved in the organic solvent system, and an amino silane coupling agent.

Embodiments of each of the foregoing aspect include one or more of the following features. The amino silane coupling agent has the formula

Wherein

Each $R_1$ is independently $R_2$, $O-(C_1-C_6\text{alkyl})$, $C_1-C_6\text{alkyl}$, or Halogen, provided that at least one of $R_1$ is $R_2$; and Each $R_2$ is independently $\{H-[(NH)-(C_1-C_6\text{alkyl})]-[(NH)-(C_1-C_6\text{alkyl})]_m[(NH)-(C_1-C_6\text{alkyl})]_n\}-$, in which m is 0 or 1 and n is 0 or 1.

The amino silane is $H-[(NH)-(C_1-C_6\text{alkyl})]-[(NH)-(C_1-C_6\text{alkyl})]_n[(NH)-(C_1-C_6\text{alkyl})]_n\text{-Si}-(R_1)_3$. The amino silane is $H-[(NH)-(C_1-C_6\text{alkyl})]-[(NH)-(C_1-C_6\text{alkyl})]_m[(NH)-(C_1-C_6\text{alkyl})]_n\text{-Si}-(R_1)_3$ in which at least two of $R_1$ are halogen or $O-(C_1-C_6\text{alkyl})$. The amino silane is $H-[(NH)-(C_1-C_6\text{alkyl})]-[(NH)-(C_1-C_6\text{alkyl})]_m[(NH)-(C_1-C_6\text{alkyl})]_n\text{-Si}-(R_1)_3$ in which at least two of $R_1$ are $-O-(C_1-C_6\text{alkyl})$. The amino silane coupling agent is selected from tri(C1-C6alkoxy)C1-C6alkylmonoamino silane, di($C_1$-$C_6$alkoxy)$C_1$-$C_6$alkylmonoamino silane, and tri($C_1$-$C_6$alkoxy) $C_1$-$C_6$alkyldiamino silane. The amino silane coupling agent is a tri($C_1$-$C_6$alkoxy)$C_1$-$C_6$alkylmonoamino silane. The amino silane coupling agent is N-β(aminoethyl)-r-aminopropyl-trimethoxysilane, N-β(aminoethyl)-r-aminopropyl-methyldimethoxysilane, 3-aminopropyl-triethoxysilane, N-phenyl-r-aminopropyl-trimethoxysilane, N-(n-Butyl)-3-aminopropyltrimethoxysilane, 3-aminopropylmethyldiethoxysilane. The ink solution includes between about 5 to about 30 weight percent of one or more amino silane coupling agents. The ink solution includes between about, 10 to about 30 weight percent of one or more amino silane coupling agents. The ink solution includes between about 15 to about 20 weight percent of one or more amino silane coupling agents. The organic solvent system comprises an organic solvent and a resin. The ink solution further includes a rheological modifier. The ink solution contains between about 0.1 and about 5 weight percent of the rheological modifier. The rheological modifier is a fumed silica. The dye or pigment is selected from Sepisol Fast Blue 2BR (Solvent Blue 43), Sepisol Fast Blue MBSN (Solvent Blue 38), Methyl Violet Base BP (Solvent Violet 8 basic), Sepisol Fast Blue ARNF (Solvent Blue 37), Sepisol Fast Blue 85219 (Basic Blue 7 derivative), Sepisol Fast Violet 881239 (Basic Violet 1 derivative), Sepisol Fast Violet 85152 (Basic Violet 3 derivative), Acid Blue 25, Acid Blue 158, and Basic Blue 54. The solution includes between about 15 to about 40 weight percent of one or more dyes in the aggregate. The dyes or pigments are dissolved in the organic solvent system. The dyes or pigments are dispersed, e.g., a dispersion of dye or pigment particles, in the organic solvent system.

Advantageously, the indelible inks when used on paper are resistant to washing with organic solvents as compared to commercially available inks of the same color. The ink solutions of the invention, when applied to paper, remain visible after more than 15, 60, and 90 minutes of washing with organic solvents.

DETAILED DESCRIPTION OF THE DRAWINGS

DETAILED DESCRIPTION OF THE INVENTION

Figure 1:
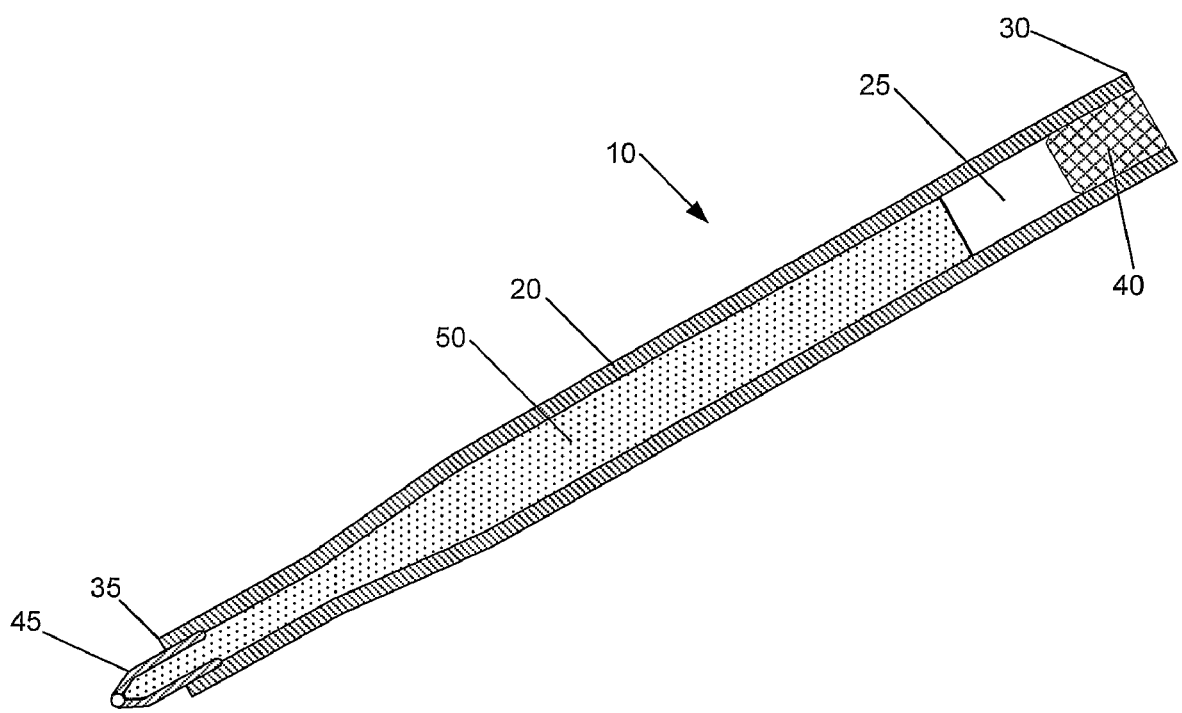
FIG. 1 illustrates a ball point pen including a closed reservoir charged with indelible ink.

An indelible ink solution includes one or more inks or dyes and a coupling agent in an organic solvent system.

The indelible ink includes any amount of an ink (i.e., dyes and pigments) or mixture thereof capable of producing a visible writing on a substrate such as natural or synthetic paper. Typically, an indelible ink includes 3 to 40 weight percent of one or more dyes or pigments. For instance, the indelible ink can include 10 to 30 weight percent of one or more dyes or pigments. In other embodiments, the indelible ink includes 15-40 weight percent or 15-35 weight percent of one or more dyes or pigments. Higher or lower amount of dyes and pigments may be used depending upon the specific dye's molecular weight and its propensity to produce a visible image on the substrate. Each dye or pigment may be any color provided that the indelible ink includes at least one violet, blue, black, or red dye. In some embodiments, the dyes or pigments are blue or violet, such as Solvent Blue 43, Solvent Blue 38, Basic Blue 54 and Solvent Violet 8.

Dyes and pigments useful for producing indelible inks can be found in the text entitled Color Chemistry by Heinrich Zollinger or the Colour Index International published by the Society of Dyers and Colourists. Examples of dyes and pigments useful for producing indelible inks include, but are not limited to, the dyes shown in Table 1.

TABLE 1

Di- and Triarylmethine Dyes and Quinone-Imine Dyes
    Malachite Green (Basic Green 4)
    Crystal Violet (Basic Violet 3)
    Methylene Blue (Basic Blue 9)
    Monolite Violet R (Pigment Violet 23)
    Procion Blue MX-G (Reactive Blue 163)
    Procion Blue H-EG (Reactive Blue 187)
    Safranin T Extra (Basic Red 2)
    Nigrosine (Aniline Black)
    Maxilon Blue (Basic Blue 3)
    Methylene Blue (Basic Blue 9)
    Sirius Light Blue FFRL (Direct Blue 108)
    Monolite Violet R (Pigment Violet 23)
Aza[18]annulenes (Porphyrins and Phthalocyanines)
    Monastral Fast Blue B (Pigment Blue 15)
    Monastral Fast Blue G (Pigment Blue 16)
    Sirius Light Turquoise Blue G (Direct Blue 86)
    Cibacron Turquoise Blue GE (Reactive Blue 7)
Azo Dyes and Pigments
    Terasil Navy Blue SGL (Disperse Blue 125)
    Resolin Blue BBLS (Disperse Blue 165)
    HTP Violet 310 (Disperse Blue 339)
    Easton Blue GFD (Disperse Blue 102)
    Serisol Blue RD
    Palanil Dark Blue RLS (Disperse Blue 148)
    Naphtol AS dyes
    Astrazon Blue GL (Basic Blue 54)
    Neolan Blue 2 G (Acid Blue 158)
    Eriochrome Black T (Mordant Black 11)
Reactive Dyes
    Procion Blue RS (Reactive Blue 6)
    Remazol Black D (Reactive Black 5)
    Azo Pigments
    Cibacron Blue 4R
    Cibacron Blue FN-R
Carbonyl Dyes and Pigments
    Indigo
    Anthraquinone dyes
        Acilan Direct Blue A (Acid Blue 25)
        Carbolan Blue B (Acid Blue 138)
        Remazonl Brilliant Blue R (Reactive Blue 19)
        Cibacron Blue F3G-A (Reactive Blue 2)
        Alizarin Saphirol B (Acid Blue 45)
        Latyl Brilliant Blue TP (Disperse Blue 87)

Dyes or pigments are commercially available from BIMA 83, BASF, Engelhard Corporation, Chem Spec, Pylam, Sun Chemical, Ciba, Carolina Color, Alcan Rubber, Orient Corporation of America.

The indelible ink coupling agent is an amino silane compound of the formula

$$Si-(R_1)_4$$

Wherein

Each $R_1$ is independently $R_2$, $O-(C_1-C_6 \text{alkyl})$, $C_1-C_6 \text{alkyl}$, or Halogen, provided that at least one of $R_1$ is $R_2$; and Each $R_2$ is independently $\{H-[(NH)-(C_1-C_6\text{alkyl})]-[(NH)-(C_1-C_6\text{alkyl})]_m[(NH)-(C_1-C_6\text{alkyl})]_n\}-$, in which m is 0 or 1 and n is 0 or 1. In some embodiments, the amino silane is $H-[(NH)-(C_1-C_6\text{alkyl})]-[(NH)-(C_1-C_6\text{alkyl})]_m[(NH)-(C_1-C_6\text{alkyl})]_n-Si-(R_1)_3$. In other embodiments, the amino silane is $H-[(NH)-(C_1-C_6\text{alkyl})]-[(NH)-(C_1-C_6\text{alkyl})]_m[(NH)-(C_1-C_6\text{alkyl})]_n-Si-(R_1)_3$ in which at least two of $R_1$ are halogen or $O-(C_1-C_6\text{allyl})$. The indelible ink solution includes between 5 and 30 weight percent, 10 to 30 weight percent, or 10 to 20 weight percent of one or more amino silanes. The indelible ink solution may include higher or lower amounts of an amino silane depending upon the molecular weight of the amino silane and ability of the amino silane to produce an indelible ink. At lower concentrations, the ink formulation including the amino silane may be susceptible to solvent washing. At higher concentrations, the ink may become unworkable due to low viscosity or appear excessively faint due to dilution of the dye content. The minimum amount of amino silane required is also determined by the amount used to react parasitically with other ingredients in the ink and pen components while providing excess residual amino silane to produce the indelible ink markings.

Examples of amino silane coupling agents useful for producing indelible inks include, but are not limited to, tri($C_1$-$C_6$alkoxy) $C_1$-$C_6$alkylmonoamino silanes, di($C_1$-$C_6$alkoxy) $C_1$-$C_6$alkyl$C_1$-$C_6$alkylmonoamino silanes, and tri($C_1$-$C_6$alkoxy) $C_1$-$C_6$alkyldiamino silanes. In certain embodiments, the amino silane coupling agent is a tri($C_1$-$C_6$alkoxy) $C_1$-$C_6$alkylmonoamino silane. Some examples of specific commercially available amino silane coupling agents are, but not limited to, N-β (aminoethyl)-r-aminopropyl-trimethoxysilane, N-β(aminoethyl)-r-aminopropyl-methyldimethoxysilane, 3-aminopropyl-triethoxysilane, N-phenyl-r-aminopropyl-trimethoxysilane, N-(n-Butyl)-3-aminopropyltrimethoxysilane, 3-aminopropylmethyldiethoxysilane. Amino silane coupling agents are commercially available from Dow Corning, General Electric, Mitsubishi International Corporation and Degussa.

The organic solvent system includes one or more organic solvents. Any organic solvent may be used to produce the indelible ink provided that the solvent(s) does not adversely interfere with the dye and coupling agent or other ink additives to decrease the indelible properties of the ink. Suitable organic solvents may posses one or more of the following characteristics: low flash point, e.g., greater than 10° C., low toxicity or carcinogenic properties, low odor, and polar. In some embodiments, the organic solvents in the organic solvent system are selected because they are capable of dissolving the dyes or pigments. In other embodiments, the organic solvent system does not or only partially dissolves the dyes or pigments such that the ink solution is a dispersion.

Examples of organic solvents include ethylene glycol, polyethelene glycol, propylene glycol, polypropylene glycol, phenoxy ethers of glycols, ethoxy ethers of glycols, propoxy ethers of glycols, butoxy ethers of glycols, benzyl alcohol, n-butanol, iso-amyl alcohol, cyclohexanol, ethanol, iso-propanol, butanol, n-methylpyrrolidone, cyclohexanone, fatty acids, oleic acid, esters of fatty acids, symmetric and asymmetric dibasic esters, symmetric and asymmetric esters of phthalic acid, chloroparaffins, soybean extracts, dimethylsulfoxide (DMSO), and linseed oil.

In some embodiments, the organic solvent system includes various resins for use as thickening agents and flow control, for example, polyvinylpyrrolidine (PVP), polycyclohexanone, polyvinyl acetate (PVA), carboxymethylcelulose (CMC), castor oil darivitives, agarose, polysacarides or natural varnishes and shelacs. The total amount of resin typically used in a formulation is between 10 and 30%. The exact amount needed is determined by the desired writing characteristics of the pen the ink is used in. Examples of these characteristics are, though there could be others, perceived smoothness of the writing, smudge resistance, ease of writing after storage and oozing of ink from the pen on storage.

In some embodiments, the indelible ink solution also includes rheological modifiers, such as modified natural and synthetic clays, functionalized and unfunctionalized fumed silica thickeners, and titanium dioxides. The indelible ink solution may include between about 0.1 to about 5 weight percent of one or more rheological modifiers. Rheological modifiers are commercially available. For instance, the Aerosil product line is available from Degussa, the Cabosil product line is available from Cabot, the Atapulgite product line is available from Engelhard, and the Bentonite product line is available from CETCO. Functionalized (hydrophobic) fumed silicas are available from Degussa as Aerosil R812, Aerosil R812S, Aerosil R974 and Aerosil R805. Other manufacturers offer materials with similar properties of surface area and surface treatment. Examples of non-functionalized (hydrophilic) fumed silicas available from Degussa are: Aerosil 90, Aerosil 200, Aerosil 300, and Aerosil 380. In some embodiments, the indelible ink includes a functionalized (hydrophobic) fumed silica. The surface of the functionalized (hydrophobic) fumed silica limits the amount of potential interaction between the functionalized (hydrophobic) fumed silica and the amino silane coupling agent in the ink formulation prior to use.

Once the indelible ink has been produced, the final solution may be used in a variety of commercially available writing instruments. Suitable writing instruments include, but are not limited to, ball point pens, fountain pens, and felt-tip pens. Writing instruments and components for writing instruments, such as ball point tips and ink reservoirs are available frOm Davro Products, Inc. of Oradell, N.J.

Referring to FIG. 1, an enclosed ink reservoir 10 includes a housing 20 defining a central bore 25. One end 30 of housing 20 is fitted with a cap 40 and the other end 35 is fitted with a ball point tip 45. During manufacture, the indelible ink 50 is charged into central bore 25 via end 30 or via end 35. Additional pressure may be placed upon the indelible ink 50 in reservoir 10 by charging bore 25 with about 3 to 40 psig of air or nitrogen prior to closing the housing 20 with cap 40. Alternatively, the housing is charged with ink and sealed at atmospheric pressure by closing the housing 20 with cap 40. Enclosed ink reservoirs are described in U.S. Pat. No. 3,425,779, which is incorporated herein in its entirety. Alternatively, pen components for enclosed or pressurized ink reservoirs are available from Accurate Forming of Hamburg, N.J. and Hartley-Racon of Costa Mesa, Calif.

Figure 2:
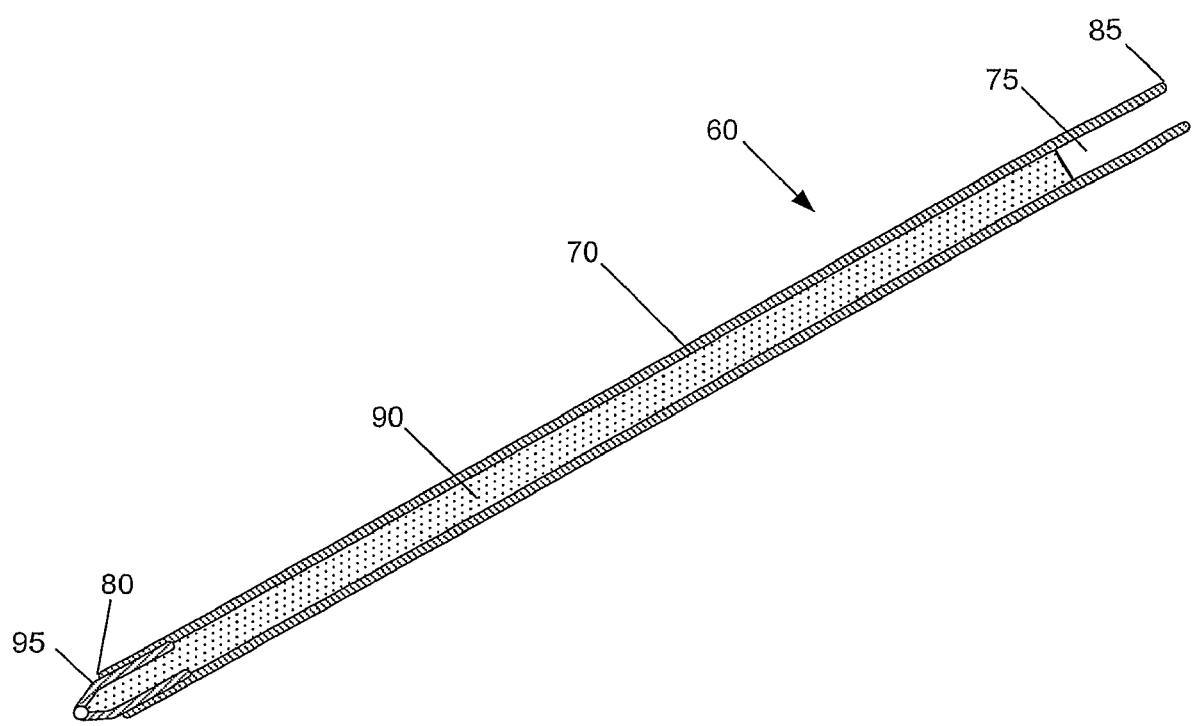
FIG. 2 illustrates a ball point pen including an open capillary-type reservoir charged with indelible ink.

Referring to FIG. 2, an open ink reservoir 60 includes a housing 70 defining a central bore 75. One end 80 of housing 70 is fitted with a ball point tip 95. During manufacture, the indelible ink 90 is charged into central bore 75 via end 85 or via end 80.

Although not shown in FIGS. 1 and 2, the ink reservoirs, typically, are inserted into a writing instrument sleeve and the writing instrument is used to mark a substrate such as paper.

All references cited above are incorporated herein by reference.

EXAMPLES

The present invention shall be explained below in detail with reference to examples and comparative examples. However, the present invention shall not be restricted to the following examples.

Example 1

Solvent Washing Ink Markings

A useful test of the indelible properties of an ink formulation includes marking several test pieces of the paper with the ink formulation, soaking the marked test papers in a range of commercial solvents, and removing the test papers and visually inspecting the markings to determine whether the solvents removed the ink markings.

Specifically, the Example ink formulations and Comparative ink formulations described in the examples below were tested in the following manner. Each ink sample was loaded into medium point ballpoint pen refills (Product Numbers X20-785 and X20-790) available from Davro Products, Inc. of Oradell, N.J. Alternately, Each ink sample was loaded into medium point pressure pen refills and pressurized to 25 psig of compressed air (medium pressure points and brass ink refill tubes) available from Accurate Forming of Hamburg, N.J. and Hartley-Racon of Costa Mesa, Calif. Each pen refill containing either an Example ink or a Comparative ink was then placed in a holder that held the pen refill vertically and applied a constant one pound of total force onto the pen refill and check stock paper. A series of 20 to 30 lowercase cursive "L' s" were then made horizontally across the face of blank check stock with the Example and the Comparative ink written onto the same check stock one above the other. The check stock was then cut into 4 to 8 smaller pieces with each piece being placed in a solvent bath for two hours with periodic agitation. The temperature of each sample was maintained between 17° C. and 25° C. during the washing. After soaking for two hours in the solvent bath, the samples were then removed and then pressed lightly between blotter papers until dry. Many commercially available solvents were tested: lacquer thinner, denatured alcohol, isopropyl alcohol, acetone, ethyl acetate, naphtha, xylene, ethylene chloride, n-methylpyrrolidone, dymethyl sulfoxide, ethoxyethanol, benzyl alcohol, ethylene glycol; diethoxy ethylene glycol. The most aggressive solvents were found to be dimethyl sulfoxide, n-methylpyrrolidone, and ethoxy ethanol.

All example inks were allowed to stand after mixing for at least 48 hours before testing.

Example 2

The following indelible ink was produced and tested.

| | | |
|---|---|---|
| Organic Solvents: | Phenoxyethanol (Dowanol EPH manufactured by Dow Corning) | 37 weight % |
| | Benzyl Alcohol | 8 weight % |
| Lubricant: | Oleic Acid | 3 weight % |
| Resins: | polyvinylpyrrolidone (Luviskol PVP K90 manufactured by BASF) | 2 weight % |
| | polycyclohexanone (Laropal K80 manufactured by BASF) | 8 weight % |
| Dyes: | Sepisol Fast Blue 2BR (Manufactured by BIMA 83) | 13 weight % |
| | Sepisol Fast Blue MBSN (Manufacture by BIMA 83) | 8 weight % |
| | Methyl Violet Base BP (Manufactured by Carolina Color & Chemical Company) | 5 weight % |
| Rheologic Modifier: | Hydrophilic Fumed Silica (Aerosil A300 manufactured by Degussa) | 1 weight % |
| Coupling Agent: | 3-aminopropyltriethoxysilane (Dynasylan Ameo-P manufactured by Degussa or Z-6011 Silane manufactured by Dow Corning) | 17 weight % |

These materials were combined in a disperser mixer in the order listed over 4 hours with the temperature maintained between 70° C. and 75° C. The temperature was reduced to 60° C. and the coupling agent added. The mixture was stirred for an additional 3 to 4 hours. Care was taken to minimize solvent evaporation during the mixing. This resulting indelible ink was used as is after mixing to fill ball point pen reservoirs.

Comparative Example 2

The following ink was produced and tested as a control for the indelible ink of Example 2.

| | | |
|---|---|---|
| Organic Solvents: | Phenoxyethanol (Dowanol EPH manufactured by Dow Corning) Benzyl Alcohol | 44 weight % 10 weight % |
| Lubricant: | Oleic Acid | 3 weight % |
| Resins: | polyvinylpyrrolidone (Luviskol PVP K90 manufactured by BASF) | 3 weight % |
| | polycyclohexanone (Laropal K80 manufactured by BASF) | 9 weight % |
| Dyes: | Sepisol Fast Blue 2BR (Manufactured by BIMA 83) | 15 weight % |
| | Sepisol Fast Blue MBSN (Manufacture by BIMA 83) | 9 weight % |
| | Methyl Violet Base BP (Manufactured by Carolina Color & Chemical Company) | 6 weight % |
| Rheologic Modifier: | Hydrophilic Fumed Silica (Aerosil A300 manufactured by Degussa) | 1 weight % |

These materials were combined in a disperser mixer in the order listed over 4 hours with the temperature maintained between 70° C. and 75° C. The mixture was stirred for an additional 3 to 4 hours. Care was taken to minimize solvent evaporation during the mixing. This comparative ink was used as is after mixing to fill ball point pen reservoirs.

Example 3

The following indelible ink was produced and tested.

| | | |
|---|---|---|
| Organic Solvents: | Phenoxyethanol (Dowanol EPH manufactured by Dow Corning) | 37 weight % |
| | Benzyl Alcohol | 8 weight % |
| Lubricant: | Oleic Acid | 3 weight % |
| Resins: | polyvinylpyrrolidone (Luviskol PVP K90 manufactured by BASF) | 2 weight % |
| | polycyclohexanone (Laropal K80 manufactured by BASF) | 8 weight % |
| Dyes: | Sepisol Fast Blue 2BR (Manufactured by BIMA 83) | 13 weight % |
| | Sepisol Fast Blue MBSN (Manufacture by BIMA 83) | 8 weight % |
| | Methyl Violet Base BP (Manufactured by Carolina Coulor & Chemical Company) | 5 weight % |
| Rheologic Modifier: | Hydrophobic Fumed Silica (Aerosil R812 manufactured by Degussa) | 1 weight % |
| Coupling Agent: | 3-aminopropyltriethoxysilane (Dynasylan Ameo-P manufacture by Degussa) | 17 weight % |

These materials were combined in a disperser mixer in the order listed over 4 hours with the temperature maintained between 70° C. and 75° C. The temperature was reduced to 60° C. and the coupling agent added. The mixture was stirred for an additional 3 to 4 hours. Care was taken to minimize solvent evaporation during the mixing. This indelible ink was used as is after mixing to fill ball point pen reservoirs.

Comparative Example 3

The following ink was produced and tested as a control for the indelible ink of Example 3.

| | | |
|---|---|---|
| Organic Solvents: | Phenoxyethanol (Dowanol EPH manufactured by Dow Corning) | 44 weight % |
| | Benzyl Alcohol | 10 weight % |
| Lubricant: | Oleic Acid | 3 weight % |
| Resins: | polyvinylpyrrolidone (Luviskol PVP K90 manufactured by BASF) | 3 weight % |
| | polycyclohexanone (Laropal K80 manufactured by BASF) | 9 weight % |
| Dyes: | Sepisol Fast Blue 2BR (Manufactured by BIMA 83) | 15 weight % |
| | Sepisol Fast Blue MBSN (Manufacture by BIMA 83) | 9 weight % |
| | Methyl Violet Base BP (Manufactured by Carolina Color & Chemical Company) | 6 weight % |
| Rheologic Modifier: | Hydrophobic Fumed Silica (Aerosil R812 manufactured by Degussa) | 1 weight % |

These materials were combined in a disperser mixer in the order listed over 4 hours with the temperature maintained between 70° C. and 75° C. The mixture was stirred for an additional 3 to 4 hours. Care was taken to minimize solvent evaporation during the mixing. This comparative ink was used after mixing to fill ball point pen reservoirs.

Example 4

The following indelible ink was produced and tested.

| | | |
|---|---|---|
| Organic Solvents: | Phenoxyethanol (Dowanol EPH manufactured by Dow Corning) | 37 weight % |
| | Benzyl Alcohol | 8 weight % |
| Lubricant: | Oleic Acid | 3 weight % |
| Resins: | polyvinylpyrrolidone (Luviskol PVP K90 manufactured by BASF) | 2 weight % |
| | polycyclohexanone (Laropal K80 manufactured by BASF) | 8 weight % |
| Dyes: | Sepisol Fast Blue 2BR (Manufactured by BIMA 83) | 13 weight % |
| | Sepisol Fast Blue MBSN (Manufacture by BIMA 83) | 8 weight % |
| | Methyl Violet Base BP (Manufactured by Carolina Coulor & Chemical Company) | 5 weight % |
| Rheologic Modifier: | Hydrophobic Fumed Silica (Aerosil R812 manufactured by Degussa) | 1 weight % |
| Coupling Agent: | Aminoethylaminopropyltrimethoxysilane (Z-6121 Silane manufactured by Dow Corning) | 17 weight % |

These materials were combined in a disperser mixer in the order listed over 4 hours with the temperature maintained between 70° C. and 75° C. The temperature was reduced to 60° C. and the coupling agent added. The mixture was stirred for an additional 3 to 4 hours. Care was taken to minimize solvent evaporation during the mixing. This indelible ink was used as is after mixing to fill ball point pen reservoirs.

Comparative Example 4

The following ink was produced and tested as a control for the indelible ink of Example 4.

| | | |
|---|---|---|
| Organic Solvents: | Phenoxyethanol (Dowanol EPH manufactured by Dow Corning) | 44 weight % |
| | Benzyl Alcohol | 10 weight % |
| Lubricant: | Oleic Acid | 3 weight % |
| Resins: | polyvinylpyrrolidone (Luviskol PVP K90 manufactured by BASF) | 3 weight % |
| | polycyclohexanone (Laropal K80 manufactured by BASF) | 9 weight % |
| Dyes: | Sepisol Fast Blue 2BR (Manufactured by BIMA 83) | 15 weight % |
| | Sepisol Fast Blue MBSN (Manufacture by BIMA 83) | 9 weight % |
| | Methyl Violet Base BP (Manufactured by Carolina Color & Chemical Company) | 6 weight % |
| Rheologic Modifier: | Hydrophobic Fumed Silica (Aerosil R812 manufactured by Degussa) | 1 weight % |

These materials were combined in a disperser mixer in the order listed over 4 hours with the temperature maintained between 70° C. and 75° C. The mixture was stirred for an additional 3 to 4 hours. Care was taken to minimize solvent evaporation during the mixing. This ink was used after mixing to fill ball point pen reservoirs.

Example 5

The following indelible ink was produced and tested.

| | | |
|---|---|---|
| Organic Solvents: | Phenoxyethanol (Dowanol EPH manufactured by Dow Corning) | 19 weight % |
| | Benzyl Alcohol | 19 weight % |
| Lubricant: | Oleic Acid | 4 weight % |
| Resins: | polyvinylpyrrolidone (Luviskol PVP K30 manufactured by BASF) | 24 weight % |
| Dyes: | Spectrasol Blue 1605 (Manufactured by Spectrum Colors Corporation) | 13 weight % |
| | Spectra Methyl Violet Base (Manufactured by Spectra Colors Corporation) | 4 weight % |
| Coupling Agent: | 3-aminopropyltriethoxysilane (Dynasylan Ameo-P manufactured by Degussa) | 17 weight % |

These materials were combined in a disperser mixer in the order listed over 4 hours with the temperature maintained between 70° C. and 75° C. The temperature was reduced to 60° C. and the coupling agent added. The mixture was stirred for an additional 3 to 4 hours. Care was taken to minimize solvent evaporation during the mixing. This indelible ink was used as is after mixing to fill ball point pen reservoirs.

Comparative Example 5

The following ink was produced and tested as a control for the indelible ink of Example 5.

| | | |
|---|---|---|
| Organic Solvents: | Phenoxyethanol (Dowanol EPH manufactured by Dow Corning) | 23 weight % |
| | Benzyl Alcohol | 23 weight % |
| Lubricant: | Oleic Acid | 5 weight % |
| Resins: | polyvinylpyrrolidone (Luviskol PVP K30 manufactured by BASF) | 29 weight % |
| Dyes: | Spectrasol Blue 1605 (Manufactured by Spectrum Colors Corporation) | 15 weight % |

| | | |
|---|---|---|
| | Spectra Methyl Violet Base (Manufactured by Spectra Colors Corporation) | 5 weight % |

These materials were combined in a disperser mixer in the order listed over 4 hours with the temperature maintained between 70° C. and 75° C. The mixture was stirred for an additional 3 to 4 hours. Care was taken to minimize solvent evaporation during the mixing. This indelible ink was used after mixing to fill ball point pen reservoirs.

Example 6

The following indelible ink was produced and tested.

| | | |
|---|---|---|
| Organic Solvents: | Phenoxyethanol (Dowanol EPH manufactured by Dow Corning) | 19 weight % |
| | Benzyl Alcohol | 19 weight % |
| Lubricant: | Oleic Acid | 4 weight % |
| Resins: | polyvinylpyrrolidone (Luviskol PVP K30 manufactured by BASF) | 24 weight % |
| Dyes: | Sepisol Fast Red (Manufactured by Bima 83) | 12 weight % |
| | Neozapon Red 355 (Manufactured by BASF) | 5 weight % |
| Coupling Agent: | 3-aminopropyltriethoxysilane (Dynasylan Ameo-P manufacture by Degussa) | 17 weight % |

These materials were combined in a disperser mixer in the order listed over 4 hours with the temperature maintained between 70° C. and 75° C. The temperature was reduced to 60° C. and the coupling agent added. The mixture was stirred for an additional 3 to 4 hours. Care was taken to minimize solvent evaporation during the mixing. This ink was used as is after mixing to fill ball point pen reservoirs.

Comparative Example 6

The following ink was produced and tested as a control for the indelible ink of Example 6.

| | | |
|---|---|---|
| Organic Solvents: | Phenoxyethanol (Dowanol EPH manufactured by Dow Corning) | 23 weight % |
| | Benzyl Alcohol | 23 weight % |
| Lubricant: | Oleic Acid | 5 weight % |
| Resins: | polyvinylpyrrolidone (Luviskol PVP K30 manufactured by BASF) | 29 weight % |
| Dyes: | Sepisol Fast Red (Manufactured by BIMA 83) | 14 weight % |
| | Neozapon Red 355 (Manufactured by BASF) | 6 weight % |

These materials were combined in a disperser mixer in the order listed over 4 hours with the temperature maintained between 70° C. and 75° C. The mixture was stirred for an additional 3 to 4 hours. Care was taken to minimize solvent evaporation during the mixing. This ink was used after mixing to fill ball point pen reservoirs.

Example 7

The dyes listed in Table 2 were tested and found to be particularly compatible with the amino silane coupling agents. The test was conducted by making a saturated solution of the dye in Phenoxyethanol (Dowanol EPH manufactured by Dow Corning). 15 weight % of 3-aminopropyltriethoxysilane (Dynasylan Ameo-P manufactured by Degussa) was added to this saturated dye solution and allowed to stand for 24 hours. This dye solution with additive Was then tested for indelibility using the test described in Example 1. These dyes can be used to create additional ink formulations by substituting the dyes listed in Table 2 for the dyes described in Example 1 through Example 5 at comparable concentrations.

TABLE 2

| | |
|---|---|
| Bima 83 | Sepisol Fast Blue 2BR (Solvent Blue 43) |
| | Sepisol Fast Blue MBSN (Solvent Blue 38) |
| | Methyl Violet Base BP (Solvent Violet 8 basic) |
| | Sepisol Fast Blue ARNF (Solvent Blue 37) |
| | Sepisol Fast Blue 85219 (Basic Blue 7 derivative) |
| | Sepisol Fast Violet 881239 (Basic Violet 1 derivative) |
| | Sepisol Fast Violet 85152 (Basic Violet 3 derivative) |
| Pylam | Acid Blue 25 |
| | Acid Blue 158 |
| | Basic Blue 54 |

Example 8

The indelible inks in Examples 2 through 6 and each companion comparative ink were tested in the solvent wash assay described in example 1. In each case, the indelible inks of this invention exhibited superior resistance to solvent washing relative to the comparative inks. In some examples, the comparative inks were completely erased while the indelible ink was still intact and visible.

What is claimed:

1. A ball point pen comprising:
a housing containing a ball point pen cartridge, wherein the ball point pen cartridge includes a ball point tip and an indelible ink solution, and wherein the indelible ink solution includes an organic solvent system, a dye or pigment dissolved or dispersed in the organic solvent system; and an amino silane coupling agent.

2. The ball point pen of claim 1, wherein the amino silane coupling agent has the formula $$Si-(R_1)_4$$

wherein
each $R_1$ is independently $R_2$, $O-(C_1-C_6\text{alkyl})$, $C_1-C_6\text{alkyl}$, or halogen, provided that at least one $R_1$ is $R_2$; and
each $R_2$ is independently $\{H-[(NH)-C_1-C_6\text{alkyl})]-[(NH)-(C_1-C_6\text{alkyl})]_m[(NH)-(C_1-C_6\text{alkyl})]_n\}-$, in which m is 0 or 1 and n is 0 or 1.

3. The ball point pen of claim 2, wherein the amino silane coupling agent is $H-[(NH)-(C_1-C_6\text{alkyl})]-[(NH)-(C_1-C_6\text{alkyl})]_m[(NH)-(C_1-C_6\text{alkyl})]_n-Si-(R_1)_3$.

4. The ball point pen of claim 3, wherein at least two of $R_1$ are halogen or $O-(C_1-C_6\text{alkyl})$.

5. The ball point pen of claim 2, wherein the amino silane coupling agent is selected from tri($C_1-C_6$alkoxy)$C_1-C_6$alkylmonoamino silane, di($C_1-C_6$alkoxy)$C_1-C_6$alkyl$C_1-C_6$alkylmonoamino silane, and tri($C_1-C_6$alkoxy) $C_1-C_6$alkyldiamino silane.

6. The ball point pen of claim 2, wherein the amino silane coupling agent is a tri($C_1-C_6$alkoxy)$C_1-C_6$alkylmonoamino silane.

7. The ball point pen of claim 1, wherein the amino silane coupling agent is N-β (aminoethyl)-r-aminopropyl-trimethoxysilane, N-β (aminoethyl)-r-aminopropyl-methyldimethoxysilane, 3-aminopropyl-triethoxysilane, N-phenyl-r-aminopropyl-trimethoxysilane, N-(n-butyl)-3-aminopropyltrimethoxysilane, or 3-aminopropylmethyldiethoxysilane.

8. The ball point pen of claim 1, wherein the solution includes between about 5 to about 30 weight percent of one or more amino silane coupling agents.

9. The ball point pen of claim 8, wherein the solution includes between about 15 to about 20 weight percent of one or more amino silane coupling agents.

10. The ball point pen of claim 1, wherein the ink solution further comprises a rheological modifier.

11. The ball point pen of claim 10, wherein the ink solution contains between about 0.1 and about 5 weight percent of the rheological modifier.

12. The ball point pen of claim 10, wherein the rheological modifier is a fumed silica.

13. The ball point pen of claim 1, wherein the dye or pigment is selected from the group consisting of Solvent Blue 43, Solvent Blue 38, Solvent Violet 8 basic, Solvent Blue 37, Basic Blue 7 derivative, Basic Violet 1 derivative, Basic Violet 3 derivative, Acid Blue 25, Acid Blue 158, and Basic Blue 54.

14. The ball point pen of claim 1, wherein the solution includes between about 15 to about 40 weight percent of one or more dyes in the aggregate.

15. The ball point pen of claim 1, wherein the cartridge is capped at atmospheric pressure.

16. The ball point pen of claim 1, wherein the cartridge is capped and pressurized to between about 3 to about 40 psig.

17. The ball point pen of claim 1, wherein the cartridge is pressurized with a gas containing at least 70% nitrogen.

18. The ball point pen of claim 1, wherein the ink solution when applied to paper remains visible after washing with one or more organic solvents.

19. An indelible ink solution comprising:
an organic solvent system;
a dye or pigment dissolved in the organic solvent system; and
an amino silane coupling agent,
wherein the solution includes between about 15 to about 20 weight percent of one or more amino silane coupling agents.

20. A pen reservoir comprising:
a housing including an indelible ink solution including
an organic solvent system,
a dye or pigment dissolved or dispersed in the organic solvent system, and
an amino silane coupling agent,
wherein the solution includes between about 15 to about 20 weight percent of one or more amino silane coupling agents.

21. The pen reservoir of claim 20, wherein the housing is capped and pressurized to between about 3 to about 40 psig.

22. The pen reservoir of claim 21, wherein the housing is pressurized with a gas comprising at least 70% nitrogen.

23. The pen reservoir of claim 20, wherein the housing includes a ball point tip.

24. A method of recording a security marking comprising:
providing a writing instrument containing an indelible ink solution, wherein the indelible ink solution includes an organic solvent system, a dye or pigment dissolved in the organic solvent system; and an amino silane coupling agent, wherein the solution includes between about 15 to about 20 weight percent of one or more amino silane coupling agents.

25. The method of recording a security marking of claim 24, wherein the writing instrument includes a cartridge that is capped and pressurized to between about 3 to about 40 psig.

26. The method of recording a security marking of claim 25, wherein the cartridge is pressurized with a gas containing at least 70% nitrogen.

\* \* \* \* \*